United States Patent [19]

Mandelcorn

[11] Patent Number: 5,646,463
[45] Date of Patent: Jul. 8, 1997

[54] SYNCHRONIZATION CONTROL FOR INTERRELATED DC VOLTAGE/BATTERY POLARITY SWITCHING CIRCUITS

[75] Inventor: Yehoshua Mandelcorn, Dallas, Tex.

[73] Assignee: Lucent Technologies Inc., Murray Hill, N.J.

[21] Appl. No.: 511,197

[22] Filed: Aug. 4, 1995

[51] Int. Cl.⁶ .................................................. H02M 3/137
[52] U.S. Cl. ........................ 307/127; 307/125; 307/138; 327/29; 327/82; 331/111; 331/129; 320/25; 363/63
[58] Field of Search ....................... 307/127, 125, 307/116, 112, 138; 320/25, 26; 363/63; 327/29, 182; 331/111, 129

[56] References Cited

U.S. PATENT DOCUMENTS

| | | | |
|---|---|---|---|
| 4,095,885 | 6/1978 | Freeman et al. | 355/226 |
| 4,144,483 | 3/1979 | Thornley | 320/25 |
| 4,338,656 | 7/1982 | Yamakido | 363/63 |
| 4,752,703 | 6/1988 | Lin | 327/391 |
| 5,182,466 | 1/1993 | Ohkubo | 307/127 |
| 5,481,211 | 1/1996 | Vietze et al. | 327/29 |

*Primary Examiner*—William M. Shoop, Jr.
*Assistant Examiner*—Albert W. Paladini
*Attorney, Agent, or Firm*—Alfred G. Steinmetz

[57] ABSTRACT

A plurality of battery/voltage polarity switching circuits are constrained to operate in switching synchronism by a timing circuit associated with each polarity switching circuit that are interrelated to one another such that only the fastest response timing circuit is operative to supply a common synchronizing signal to all the polarity switching circuits.

20 Claims, 2 Drawing Sheets

SYNCHRONIZATION CONTROL FOR INTERRELATED DC VOLTAGE/BATTERY POLARITY SWITCHING CIRCUITS

FIELD OF THE INVENTION

This invention relates to a DC voltage/battery polarity switching circuit and in particularly to associated synchronization circuitry to allow the polarity switching circuit to synchronously operate without current-flow impediment/interference in a power system with other polarity switching circuits.

BACKGROUND OF THE INVENTION

A DC voltage/battery polarity switching circuit, as used herein, is one generally used to generate a low frequency periodic hard waveform (i.e.,trapezoidal) AC voltage from a DC voltage input. Due to the low frequency of operation, these polarity switching circuits cannot efficiently utilize galvanically isolating magnetic components between the input and output.

These polarity switching circuits are often used in a power system with a plurality of these polarity switching circuits connected to operate off of a single DC voltage source and all the switching circuits being connected to a common ground. If the switches are not synchronized, one switch's polarity may be at a variance with that of another switch, thereby causing destructive circulating currents which may destroy the polarity switch and/or the DC voltage/battery voltage source.

SUMMARY OF THE INVENTION

According to the invention, a synchronization circuit is provided for constraining a plurality of DC voltage polarity switches to operate in synchronization as claimed in the claims.

DETAILED DESCRIPTION

Figure 1:
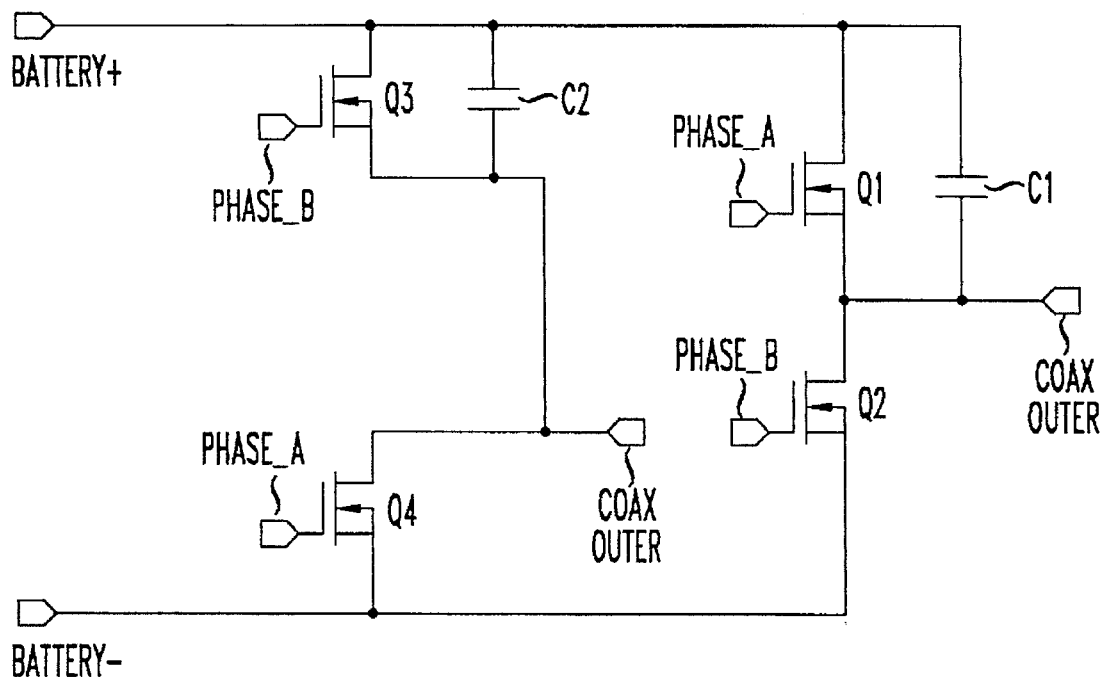
FIG. 1 is a schematic of a DC voltage/battery switching circuit.

The DC voltage Polarity Switch, shown schematically in FIG. 1, uses 4 FET power switches Q1, Q2, Q3 and Q4 connected in a bridge circuit, to alternately switch the polarity of the DC voltage input connections to output terminals COAX-INNER and COAX-OUTER connected to the inner and outer sheath of a co- axial cable which is connected to a load to be energized by the low frequency AC voltage. Half of the cycle time positive DC voltage is tied to COAX-OUTER and negative DC voltage to COAX-INNER, and the other half of the cycle time negative DC voltage is tied to COAX-OUTER and positive DC voltage to COAX-INNER. In an illustrative system having four loads to be energized up to 4 polarity switches are powered off of a single DC voltage source.

In the illustrative system all the COAX-OUTERS are connected to earth ground, hence, it follows that unless the polarity switches are synchronized, a situation arises where one phase of a polarity switch connects positive DC voltage to earth ground and another simultaneous phase of another polarity switch connects negative DC voltage earth ground. This occurrence will effectively short out the DC voltage source and lead to large destructive currents.

The switches are shown in the FIG. 1 as MOSFET's, but could also be bipolar transistors. The output is described as going to a coaxial cable, with the output tied to the COAX-INNER and the output return tied to "COAX-OUTER", but in general can be any load connection.

The power train consists of 4 switches connected in an H-Bridge off the DC voltage input with opposite legs being turned on and off every alternate cycle to deliver an alternating trapezoidal voltage wave to the output coaxial cable.

The periodic cycle is split into 2 phases (A & B), each having an interval equal to 50% of the time. During Phase A: Q1 is turned on pulling COAX-OUTER to $V_{DC}+$ and Q4 is turned on pulling COAX-INNER to $V_{DC}-$. During Phase B: Q2 is turned on pulling COAX-OUTER to $V_{DC}-$ and Q3 is turned on pulling COAX-INNER to $V_{DC}+$.

If two polarity switches are operating off the same DC voltage source and their COAX-OUTERS are tied to earth ground (and each other): Then, if they are not synchronized, a Q1 in one polarity switch could be conducting and connected to pull the $V_{DC}+$ terminal to earth ground, and a Q2 in another polarity switch could be on pulling $V_{DC}-$ to earth ground, thereby shorting out the DC voltage source and leading to large destructive circulating currents. The proposed synchronization circuitry shown in FIG. 3 allows all polarity switches in a power systems to be tied to the same DC voltage source and to switch in synchronization and avoid the above mentioned destructive shorting of the DC voltage source.

Figure 2:
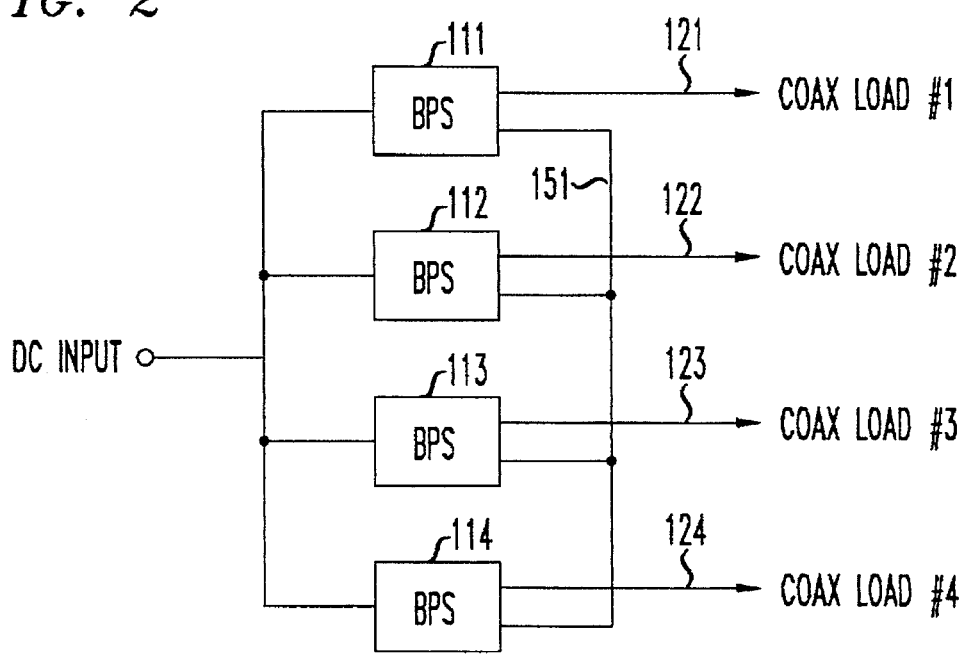
FIG. 2 is a block schematic of a power system comprising a plurality of interconnected DC voltage/battery polarity switching circuits.

A power system in which a plurality of polarity switches are interconnected is shown schematically in the FIG. 2. DC voltage is applied to the inputs of a plurality of DC voltage polarity switching circuits 111, 112, 113 and 114. Each of the DC voltage polarity switching circuits 111 to 114 is connected to an independent load, connected to the output leads 121,122, 123 and 124, respectively. In the exemplary embodiment the connection to each load is by a co-axial cable. Each individual load is capable of being energized by a DC voltage or a low frequency AC voltage (e.g., 1 Hz to 60 Hz) having a hard waveform (e.g., trapezoidal). The individual polarity switching circuits 111 to 114 are not galvanically isolated from one another and hence it is necessary to operate these circuits in switching synchronism with one another. Synchronism control is included within each of the BPS circuits as described below Lead 151 symbolically shows the synchronization signal interconnection.

Figure 3:
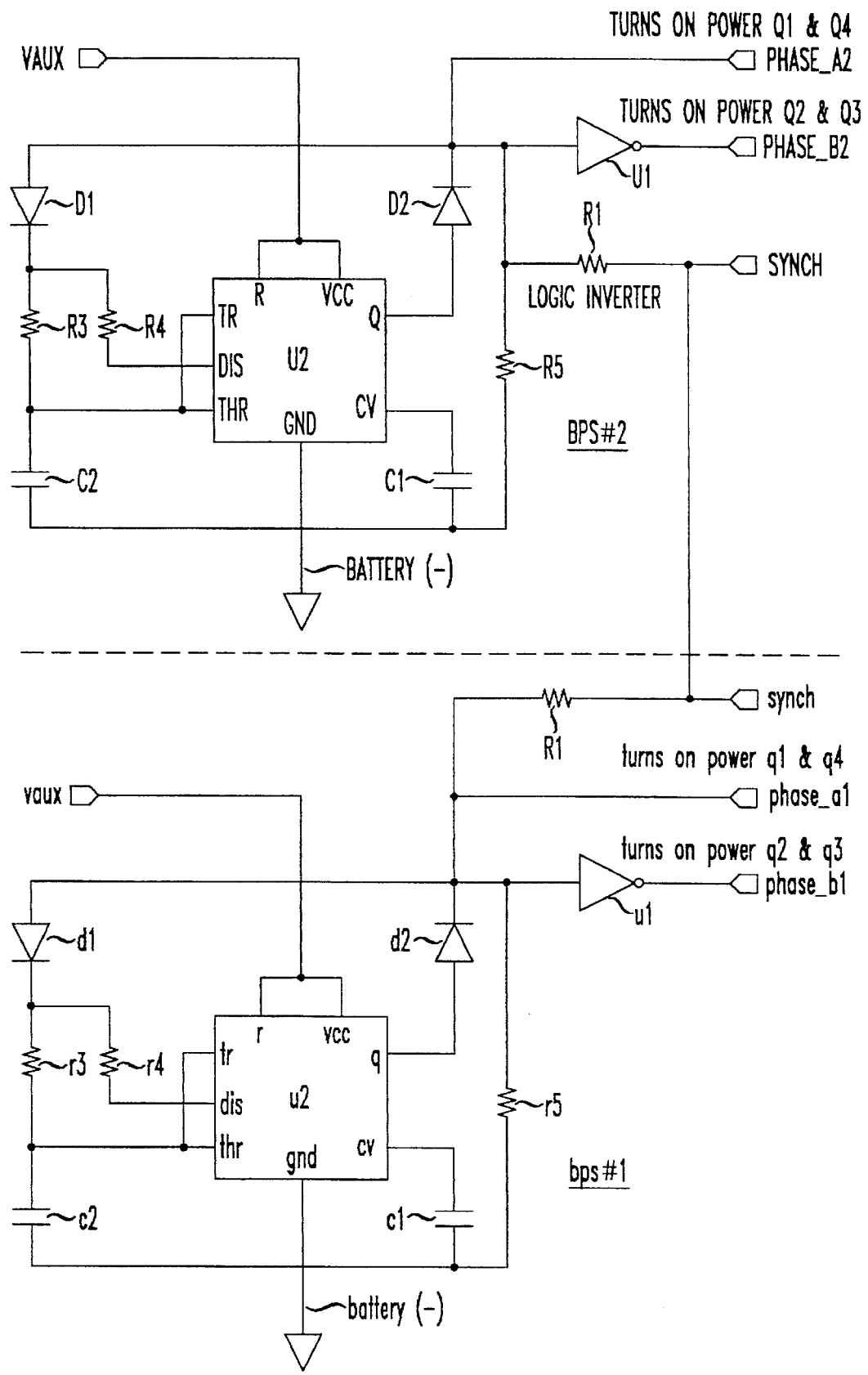
FIG. 3 is a schematic of synchronization circuitry for synchronizing operation of a plurality of polarity switching circuits.

Synchronization circuitry is illustratively shown in the FIG. 3 for synchronizing the switching of two paralleled bipolar switching circuits. Though only two circuits are synchronized, it is to be understood that more circuits may be added to the system and controlled by the same principles. Each synchronization circuit is associated with one of the bipolar switching circuits. The two synchronization circuits are identical. For clarity the components of the first and second are identified by upper case and lower case characters, respectively.

Each synchronization circuit comprises a multistate IC timing circuit, U2 and u2, having a drive output to the power switches connected to the DIS and Q terminals. Each timing circuit is in the illustrative embodiment includes a 555 timer which is known to those skilled in timing arts. The 555 timer here is used as the oscillator to generate the 1–60 Hz, 50% duty cycle square wave to control the polarity of the BPS. When an oscillator is desired using the "555" Timer, its trigger TR and threshold pins THR are tied to each other and to a capacitor (C2 or c2). Logic inside the "555" causes its output to go high whenever the voltage on these pins drop below ⅓ the aux voltage VAUX, and the output to go low whenever the voltage on these pins rise above ⅔ the aux voltage VAUX. Also, when the output goes low, the discharge pin DIS goes low and is typically used to discharge the timing capacitor to below the ⅓ aux voltage and re-start the cycle.

The oscillation cycle may be defined in terms of the charge of the capacitor C2 (c2). Starting with C2 dropping below ⅓ the Aux (VAUX); the output of U2, the "555" ("Q" pin 3) goes high and the discharge pin 7 becomes an open circuit. With the output high, through D2 and D1, current flows through R3 to charge voltage on C2 from ⅓ VAUX to ⅔ VAUX. As soon as voltage on C2 (and U2 pins 2 & 6) reach ⅔ VAUX; the output pin 3 of U2 goes low and discharge pin 7 of U2 pulls low. Voltage on C2 discharges through R3 and R4 and the discharge pin 7 until the voltage on C2 drops below ⅓ VAUX. Then the discharge pin 7 goes open circuit and output pin 3 goes high and the cycle repeats. The values of C2, R3, and R4 are chosen to achieve the desired BPS frequency and the 50% duty cycle.

As a stand alone timer for a single BPS, the oscillator would operate perfectly without D1 or D2. The circuit would then be a "555" timer. However, these dimes are needed to provide the synchronization between BPS's when more than one BPS is connected to a single Battery.

D2 serves to provide the diode OR-ing between BPS timers, such that if any one timer output is high, the common "SYNCH" signal will be high. This will force on all BPS's the "PHASE-A" power switches to be on. When all timer outputs are low, the common "SYNCH" signal will be low, and the "PHASE-B" power switches will be on. R5 serves as a pull down resistor to pull this SYNCH line low. The R1 in series from D2 to the common SYNCH signal is a very low value and does not affect logic levels. It only serves to isolate high frequency electrical noise from one BPS to another.

D1 serves to allow the one BPS timer that actually goes high first to "take over" and control the timing, and push the other BPS timers into the quiescent state so that they do not affect the timing. When the first BPS timer C2 drops below ⅓ VAUX and the timer's output goes high, the SYNCH signal goes high, which in turn through the D1's on all the BPS's pulls the inputs to all the R3's high and stops the discharge of all the C2's. Hence, only the above mentioned first timer's C2 ever reaches below ⅓ VAUX causing its output to go high. Hence, all the timers except one remain low throughout the entire cycle. The other timers only take over if the BPS with the fastest timer is removed from the circuit. Then the second fastest timer takes over.

Start-up: With the C2's on all the timers at zero volts, all the timers outputs start off high. Until all the C2's reach ⅔ VAUX, the SYNCH signal remains high through the D2 OR-ing diodes. No discharge of any of the C2's can occur since the high SYNCH through the D1's keeps the input to all the R3's high. When all the C2's reach ⅔ VAUX, then the SYNCH signal goes low, and all the C2's discharge through their respective R3+R4's. The first C2 to reach below ⅓ VAUX, causes it's timer output (U2 pin 3) to go high and pull SYNCH high, ending discharge to all the C2's and starting them all charging up again. Hence, only 1 timer goes high each cycle. When the C2 of the timer that went high reaches ⅔ VAUX, the timer output and SYNCH go low again, and the cycle is repeated.

Since all the timers except the fastest one are always low, if the BPS with the controlling timer was ever removed, the SYNCH signal will always go low and all the remaining timing C2's would discharge. When the first C2 drops below ⅓ VAUX, it's timer output (U2 pin 3) will go high and take over controlling all the remaining BPS's.

The salient features of this arrangement are that:
a) The combined SYNCH signal directly simultaneously controls the polarity of all the BPS's.
b) The timers are connected such that the fastest timer takes over the control of all the BPS's. If the BPS with the fastest timer is removed, the BPS with the next fastest timer will take over.

While the two diode circuit is described in the illustrative embodiment as connected to a "555" timer, it can work connected to any 2 threshold relaxation oscillator.

While the polarity of the diodes (D1 & D2) are shown OR- ing to a high output SYNCH signal, they could also operate with their polarities reversed to "or" to a low SYNCH signal.

The invention claimed is:

1. A synchronization control for providing a drive signal to a plurality of voltage/battery polarity switching circuits, each of the plurality of polarity switching circuits having at least one switch responsive to an occurrence of the drive signal, the synchronization control comprising:

a synchronization circuit, associated with corresponding each of the polarity switching circuits, including:

a two threshold relaxation oscillator having a voltage threshold responsive trigger input responding to place an output of the oscillator to a first state in response to a voltage below a first threshold voltage and a second state in response to a voltage above a second threshold voltage, the voltage threshold input detected across a voltage storage device coupled to the oscillator;

the output of the oscillator being connected to an OR-ing circuit with an output of another two-threshold relaxation oscillator of another synchronization circuit associated with another of the plurality of polarity switching circuits; and a synchronization interconnection between the synchronization circuit associated with the ones of the plurality, of polarity switching circuits another synchronization circuit associated with another of the ones of the plurality, of polarity switching circuits whereby one of synchronization circuits provides the drive signal to the plurality of polarity switching circuits.

2. The synchronization control as claimed in claim 1 further comprising an isolation diode for controlling a charging of the voltage storage device.

3. The synchronization control as claimed in claim 1 wherein the voltage storage device is a capacitor.

4. The synchronization control as claimed in claim 1 wherein the OR-ing circuit includes a diode connected to a lead supplying a signal in common to the plurality of polarity switching circuits and to the synchronization circuits.

5. The synchronization control as claimed in claim 1 wherein the OR-ing circuit includes a diode, a cathode of the diode is connected to a lead supplying a signal in common to the plurality of polarity switching circuits and an anode of the diode is connected to the synchronization circuits.

6. The synchronization control as claimed in claim 1 wherein the two threshold relaxation oscillator includes a timing circuit.

7. The synchronization control as claimed in claim 1 further comprising a mechanism to ensure that only one of the synchronization circuits is operative to provide the drive signal.

8. A synchronization control for providing a drive signal to a plurality of switching circuits, comprising:

a plurality of dual threshold relaxation oscillators, coupled to the corresponding voltage storage devices, that each assume a first state when a voltage across a corresponding voltage storage device is below a first threshold voltage and a second state when the voltage across the corresponding voltage storage device is above a second threshold voltage; and an OR-ing circuit, coupled to outputs of the plurality of oscillators, that, when a controlling one of the plurality of oscillators assumes the first state allows the controlling one of the plurality of oscillators to provide the drive signal.

9. The synchronization control as claimed in claim 8 wherein the switching circuits are polarity switching circuits having a first and second switch, the drive signal drives the first switch into a conduction mode when the controlling one of the plurality of oscillators is in the first state, the polarity switching circuits assuming a first polarity when the first switch is in the conduction mode, the drive signal drives the second switch into a conduction mode when the plurality of oscillators are in the second state, the polarity switching circuits assuming a second polarity when the second switch is in the conduction mode.

10. The synchronization control as claimed in claim 8 wherein the voltage storage devices are capacitors.

11. The synchronization control as claimed in claim 8 wherein the plurality of oscillators include a timing circuit.

12. The synchronization control as claimed in claim 8 further comprising a diode coupled to the voltage storage devices to control a charging of the voltage storage devices.

13. The synchronization control as claimed in claim 8 wherein the OR-ing circuit includes a diode connected to a lead for providing a path for the drive signal.

14. The synchronization control as claimed in claim 8 wherein the OR-ing circuit includes a diode connected to a lead for providing a path for a signal to the plurality of oscillators.

15. A method of operating a synchronization control to provide a drive signal to a plurality of switching circuits, comprising the steps of:

causing a plurality of dual threshold relaxation oscillators, coupled to corresponding voltage storage devices, each to assume a first state when a voltage across a corresponding voltage storage device is below a first threshold voltage and a second state when the voltage across the corresponding voltage storage device is above a second threshold voltage; and when a controlling one of the plurality of oscillators assumes the first state, allowing the controlling one of the plurality of oscillators to provide the drive signal.

16. The method as claimed in claim 15 wherein the switching circuits are polarity switching circuits each having a first and second switch, the method further comprising the step of driving the first switch into a conduction mode when the controlling one of the plurality of oscillators is in the first state, the polarity switching circuits assuming a first polarity when the first switch is in the conduction mode, the method further comprising step of driving the second switch into a conduction mode when the plurality of oscillators are in the second state, the polarity switching circuits assuming a second polarity when the second switch is in the conduction mode.

17. The method as claimed in claim 15 wherein the voltage storage devices are capacitors.

18. The method as claimed in claim 15 further comprising the step of controlling a charge across the voltage storage devices.

19. The method as claimed in claim 15 wherein the step of selecting comprises the step of supplying the drive signal through a diode of an OR-ing circuit.

20. The method as claimed in claim 15 wherein the step of causing comprises the step of supplying a signal to one of the plurality of oscillators through a diode of an OR-ing circuit.

* * * * *